Nov. 21, 1939.   J. H CLASEN   2,180,458
DISK HARROW
Filed Aug. 9, 1938    4 Sheets-Sheet 1

INVENTOR.
JOHN H. CLASEN
BY
ATTORNEYS.

Nov. 21, 1939.   J. H. CLASEN   2,180,458
DISK HARROW
Filed Aug. 9, 1938   4 Sheets-Sheet 3

Fig. 3.

INVENTOR.
JOHN H. CLASEN
BY James M. Abbett
ATTORNEYS.

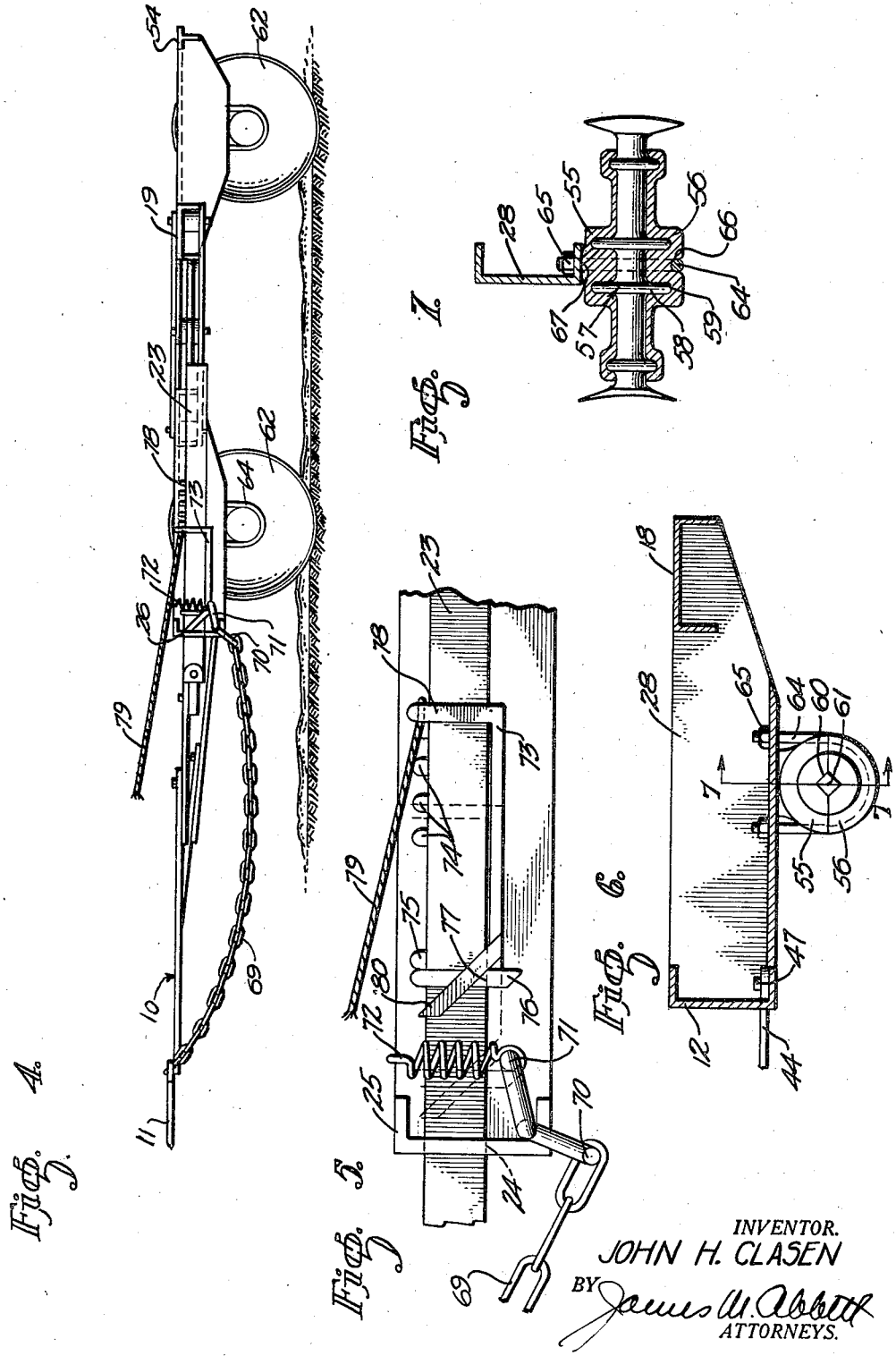

Patented Nov. 21, 1939

2,180,458

UNITED STATES PATENT OFFICE 2,180,458

DISK HARROW

John H. Clasen, Anaheim, Calif.

Application August 9, 1938, Serial No. 223,841

11 Claims. (Cl. 55—83)

This invention relates to an agricultural implement and particularly pertains to a disk harrow.

In the operation of disk harrows as used in connection with tractors, and which harrows are especially adapted for the cultivation of the ground in an orchard, it is desirable to provide a harrow which may be drawn directly in the rear of the tractor or along a path of travel offset from the exact path of travel of the tractor. It is also desirable to provide such a tractor with means whereby the frames and disk gangs of the harrow will track with the tractor when the tractor negotiates either a right-hand or left-hand turn in an advancing or backward movement and when the harrow is in a cutting position.

It is the principal object of the present invention to provide a disk harrow which is simple in construction and is so designed as to have lateral and horizontal rigidity, and which may be easily and automatically operated when in draft position, and when a tractor with its harrow is turned to either the right or left-hand.

The present invention contemplates the provision of a pair of gangs of harrow disks mounted in separate frame units and comprising a lead unit and a following unit, the said units being articulately connected so that they may be set in a desired draft position and so that they may swing in relation to each other to desired positions of angularity in negotiating right and left-hand turns, the lead unit being articulately connected to a tractor by a draw-bar structure and the following unit being articulately connected to the tractor whereby the cooperative action between the draw-bar structures and the following and lead units may be produced to dispose the lead and following units at appropriate angles to each other and to the tractor when the tractor negotiates either a right-hand or a left-hand turn.

The invention is illustrated by way of example in the drawings in which

Fig. 3 is a view in plan similar to Fig. 1, showing the harrow with the parts in the position they will assume when negotiating a right-hand turn.

Fig. 4 is a view in side elevation showing the complete harrow and indicating the relationship of the draft elements.

Fig. 5 is an enlarged view in side elevation indicating the details of the locking and setting mechanism.

Fig. 6 is a view in transverse section as seen on the line 6—6 of Fig. 1, showing the mounting for the bearings.

Fig. 7 is a view in longitudinal section as seen on the line 7—7 of Fig. 6.

Figure 1:
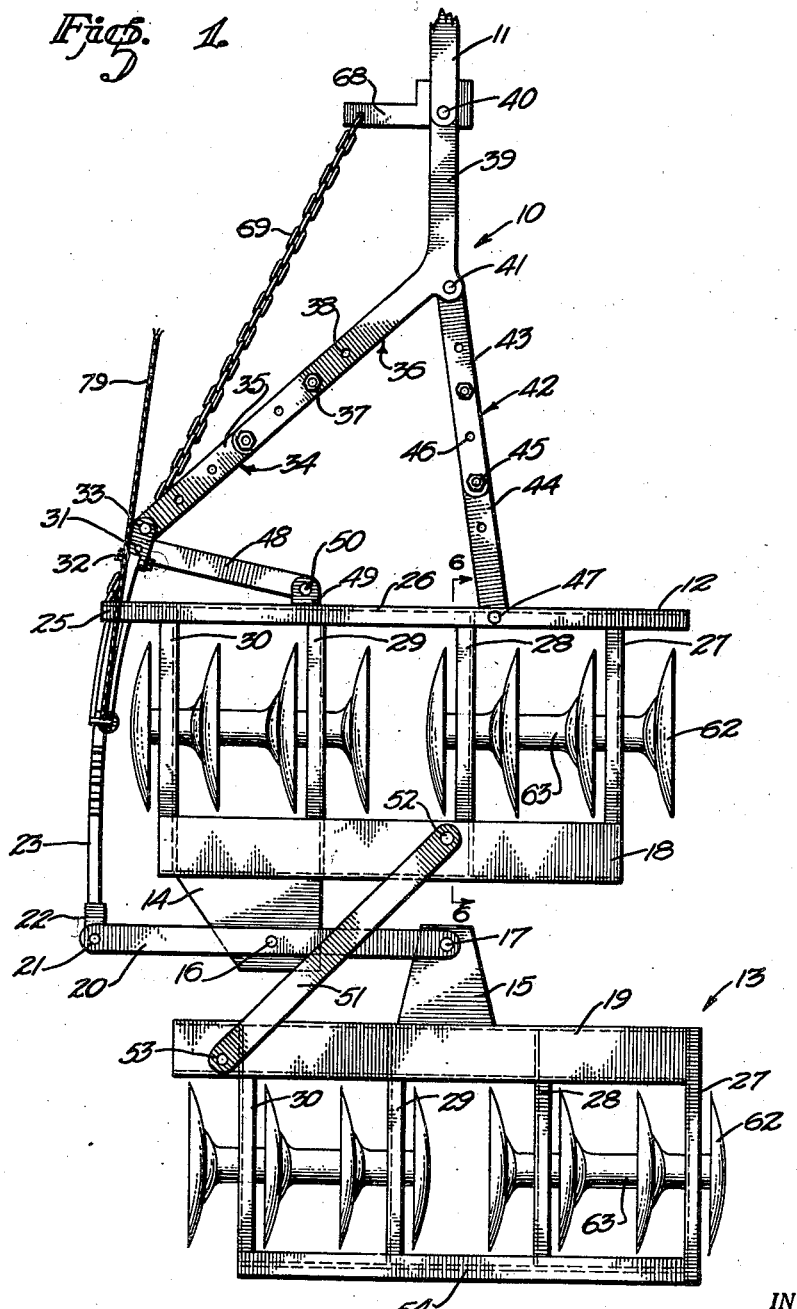
Figure 1 is a view in plan showing a disk harrow attached to a tractor with the parts in the position normally assumed by them when the tractor is pulling in a direction straight ahead.

Referring more particularly to the drawings, 10 indicates a main draw-bar construction attached to a tractor draw-bar 11 at its forward end and to the leading section 12 of the harrow at its rear end. A following section 13 also comprises part of the harrow construction. The leading section 12 and the following section 13 are provided with journal brackets 14 and 15, respectively, upon which pivots 16 and 17 are mounted. The journal bracket 14 is mounted upon and extends horizontally from the rear transverse frame element 18 of the lead section, and the bracket 15 extends forwardly from the front transverse frame element 19 of the following section. The bracket 15 is disposed substantially midway the length of the frame element 19, while the bracket 14 is offset from the center of the leading section and is disposed near the left end of the rear frame element 18 of the leading section. Connecting the two brackets and their pivot pins 16 and 17 is a spacing bar 20. This spacing bar is connected to the bracket 14 by the pivot 16 at a point intermediate the length of the bar and is connected to the bracket 15 by the pivot 17 at a point adjacent its right end.

The spacing bar 20 represents a lever of the simple type having a free end extending at the left-hand side of the pivot 16 and carrying a pivot pin 21 which receives a shackle 22. The shackle 22 is connected with an auxiliary draw-bar 23 which extends through an opening 24 in a guide bracket 25 of the leading section 12. The portion 25 is a continuation of the front transverse frame element 26 of the leading frame and is parallel to the transverse member 18. A plurality of lateral frame sections 27, 28, 29 and 30 connect the front and rear frame sections 26 and 18. The transverse and lateral elements are preferably formed of structural steel of channel section. The transverse elements 18 and 19 of the two sections are of greater width than the rest of the sections and provide suitable stability to the structures. The auxiliary draw-bar 23 is arcuate in longitudinal formation and is connected to a shackle 31 at its forward end, to which it is pivoted by a pin 32. The shackle 31 is also fitted with a pin 33 by which it is connected with a rigid draw-bar leg 34. The draw-bar leg 34 is made in two sections 35 and 36 which are adjustably bolted together by bolts 37 passing through openings 38. The section 36 is formed rigid with a forwardly projecting draw-bar element 39 which is disposed at an angle thereto. A king-pin 40 pivotally connects the member 39 with the main draw-bar 10. At the point of juncture of the draw-bar element 36 and the element 39 a pivot pin 41 is provided. This pivotally attaches a swinging draw-bar element 42 to the draw-bar 39. The element 42 comprises draw-bar sections 43 and 44, here shown as being bolted together by bolts 45 passing through openings 46. The draw-bar element 43 is pivotally connected to the forward transverse member 26 of the leading section 12 by a pivot bolt 47. Attention is directed to the fact, as shown in Fig. 6 of the drawings, that the pivot pin 47 engages the lower leg of the channel frame element 26, and thus the draw-bar is attached in a manner to tend to stabilize the structure. The draw-bar is further stabilized by a stabilizing link 48 which is secured at its outer end to the shackle 31 and at its inner end to a bracket 49 by a pin 50. The bracket 49 is secured to the forward face of the transverse frame element 26 of the lead section 12.

The lead section 12 and the following section 13 are connected by the spacing bar 20. It is preferable that the spacing bar be made in two complementary parts, one extending above the brackets 14 and 15 and the other extending therebeneath and parallel thereto. The two sections are also connected by the secondary draw-bar 51 which comprises two complementary bars, one disposed above and across the spacing bar structure 20 and the other disposed beneath and across the spacing bar structure. The forward ends of the secondary draw-bar elements are pivoted to the rear transverse frame element 18 of the following section upon a pivot pin 52. The rear ends of this section are pivoted to the forward transverse element 19 of the frame of the following section by pins 53. Thus, it will be seen that the lead section 12 and the following section 13 are articulately connected for relative movement in a horizontal plane but are held rigidly vertically due to the arrangement of the spacing bar 20 and the auxiliary draw-bar 51. The following section 13 is formed with a frame substantially the same as the lead section 12 save that the front transverse member of the lead section is of channel construction with web of the channel extending vertically while the front transverse member of the following section is disposed with its channel web extending horizontally. The transverse member 18 of the lead section is formed with its channel horizontally while the transverse rear element 54 of the following section is disposed vertically the same as the section 26.

The members 19 and 54 are held together by connecting frame elements 27, 28, 29 and 30, as previously described. These elements are of channel section and are arranged with their webs extending vertically and parallel. Carried by the lateral frame elements 27 to 30, inclusive, are bearing elements 55 and 56, which fit around a bearing bushing 57. The bearing bushing 57 is formed with a plurality of annular beads or shoulders 58 which seat within recesses 59 of the bearing structure 56 and are thus prevented from moving longitudinally of the bearing while freely rotating. The bearing bushings are formed with a central square opening 60 which receives the square shaft 61 for the plow disks 62. These disks are formed with squared openings through which the square shaft 61 extends. The spacing spools 63 are disposed between the plow disks 62 which are not directly at the opposite ends of the bearings 56.

As shown in Fig. 6 of the drawings the two halves 55 and 56 of the bearings are held together and fastened to lateral frame elements 28 by U-bolts 64. The U-bolts are fastened by nuts 65 and extend around and within a groove 66. It will thus be seen that the U-bolt holds the bearing structure at one point and in one transverse plane. In order to insure that the axle structure 61 with its plow disks 62 may be readily aligned without accurate adjustment of the bearings carried by the different lateral elements 27 to 30, inclusive, the bearing element 56 is formed with an arcuate protrusion 67 at a point midway its length, as shown in Fig. 7. This protrusion bears against the flat face of the leg of the channel element to which the bearing is fastened and thereby insures that the bearing may slightly rock longitudinally and automatically align itself on the frame structure.

It is to be understood that when the plow is assembled all of the concave plow disks of the lead unit 12 are oppositely arranged from all of the plow disks on the following unit 13, and that when the lead unit and following unit are in the position shown in Fig. 1 there will be no plowing action. Due to this there is no difficulty in pulling the harrow straight ahead in a non-cutting position. It is also to be understood that when the sets of disks on the lead unit 12 and the following unit 13 are in the position shown in Fig. 2 of the drawings the structure will turn a furrow since the plane of the cutting edges of the disks 62 will be in an angle to the direction of travel of the structure on straight pull. At such a time there will be no difficulty in negotiating a left-hand turn since the angular positions of the plane of the cutting edges of the disks will be substantially tangent to the arcuate path pursued in the turn and will only be an increase in angularity over that shown in Fig. 2 of the drawings. When, however, the harrow is to be turned to the right the turn is made against the angle of the plane of the cutting edges of the disks, and it is a particular object of the present invention to automatically re-adjust the lead section 12 and the following section 13 to arrange the planes of the cutting edges of the disks so that they will be substantially tangent to the curve of the path of travel pursued on a right-hand turn.

In order to accomplish these various results it is necessary to provide a cooperative action between the draw-bar of the tractor and the lead section 12. To accomplish this, a turning arm 68 is rigidly secured to the draw-bar 10 and extends at right-angles thereto and at the left side of the king-pin 40. Attached to this turning arm is a collapsible angling element 69 which may be in the form of rigid members adapted to be contracted and distended with relation to each other or which may be a chain, as indicated in the drawings. One end of the angling member 69 is secured to the arm 68. The other end of this member is secured to a trip arm 70 which is pivoted to the transverse frame element 26 near the lower edge thereof and carries a lock lever 71 yieldably held in its uppermost position by springs 72 and disposed beneath the lower face of the auxiliary draw-bar 23. Mounted upon the auxiliary draw-bar 23 is a latch frame 73 which will slide along the auxiliary draw-bar 23 and which may be brought to engage latch lugs 74 and a latch lug 75. The latch frame 73 has a lower portion extending beneath the auxiliary draw-bar 23 and moving therealong. At the forward end of this lower portion is a latch lug 76 which may engage the transverse member of the lever 71 to hold the latch frame structure in its forward position for purposes to be hereinafter described.

At the forward end of the frame 73 is a yoke 77 through which the auxiliary draw-bar 23 extends and at the rear end of the frame is a yoke 78 through which the draw-bar 23 extends. The vertical length of the yokes is such as to make it possible for them to be lifted so that they will ride over the tops of the lugs 74 or 75 and may be seated against a selected lug. This lifting action is brought about by a cable 79 which may be operated by the driver of the tractor when desired. The forward yoke 77 also carries a stop element 80 which will abut against the transverse frame member 26 and limit rearward movement of the front left corner of the lead section 12 in a manner to be hereinafter described.

In operation of the present invention it is first assumed that the plow may be drawn straight ahead without cutting, in which instance the structure will be in the assembled position shown in Fig. 1 of the drawings. It is to be understood that previous to this operation the draw-bar elements 34 and 42 have been adjusted for longitudinal length so that the offset of the frame of the lead unit 12 will be as desired. In the non-cutting position the auxiliary draw-bar 23 has been moved with relation to the front section until the lock element 71 has engaged the lock lug 76 on the locking frame 73, and since the yoke 78 is in a definite relation to the locking member 74 on the auxiliary draw-bar 23 the entire structure will be held against a separation movement and the lead section 12 will be locked with relation to the auxiliary draw-bar and the main draw-bar.

Figure 2:
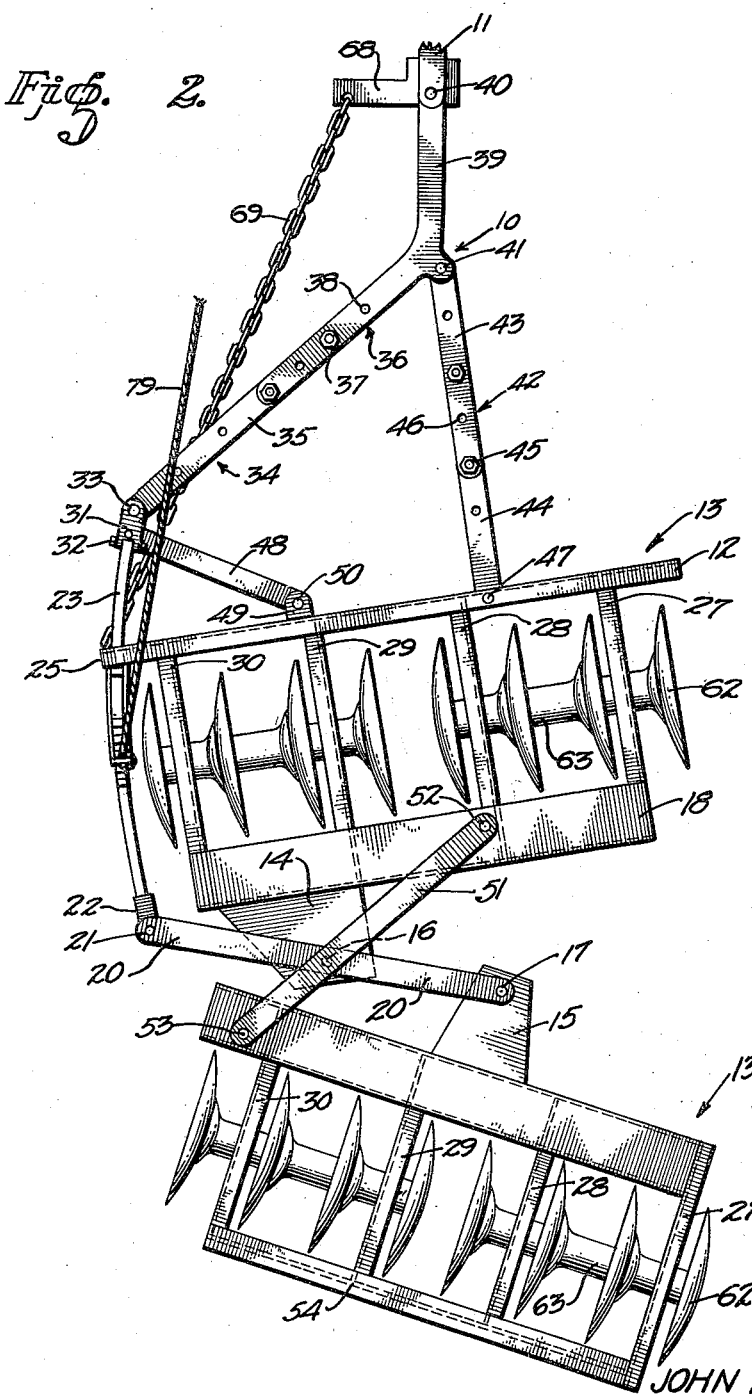
Fig. 2 is a view in plan similar to Fig. 1, showing the harrow with the parts in the position they will assume when cutting.

When it is desired to dispose the device in the cutting position the cable 79 is lifted, and this will raise the yoke 78 at the rear of the locking frame 73 so that the auxiliary draw-bar may move through the yokes of the locking frame 73 until a desired angularity of the lead section 12 is produced. It is to be understood that this angularity will be created due to a direct forward pull of the tractor with the locking frame 73 disenaged from the auxiliary draw-bar 23. The forward member 80 of the auxiliary draw-bar 23 at this time bears against the transverse frame member 26, and since the disks 62 in the ground will resist forward pulling movement as a pull is exerted on the draw-bar structure 10, the frame of the lead section will tend to pivot on the pivot pin 47 connected with the draw-bar arm 34 and the free end of the lead section, that being the left end, will tend to lag and pull away from the free end of the draw-bar arm 34. This will cause the auxiliary draw-bar 23 to be drawn through the bracket end 25 of the lead section and will produce a re-adjustment of the pivot pins of the spacing bar, in which event the pivot pin 21 will move forwardly from its normal position as shown in Fig. 1 and a pivot pin 16 will move rearwardly of that position. This will cause the spacing bar 20 to in effect swing upon the pivot pin 21 and swing the free end of the spacing bar 20 rearwardly. The free end of the spacing bar 20 is connected to the bracket 15 of the following section 13 by a pin 17, and since the secondary draw-bar 51 is secured to the lead section at 52 and the following section at 53, the following section will assume an angle oppositely from that of the lead section and will present the plow disks 62 of the two sections at opposite angles, as shown in Fig. 2. The exact degree of this angularity is determined by the setting of the yoke 78 of the frame 73 with relation to the auxiliary draw-bar 23. At this particular time the angle member 69, here shown as a chain, is slightly slack. In the event that a left-hand turn is to be negotiated it is evident that the chain 69 will be further slackened and that the plow disk will be free to track as determined by the direction given by the tractor.

When a right-hand turn is to be negotiated the tractor will tend to swing to the right, as shown in Fig. 3 of the drawings, and this will also swing the angle arm 68 and will pull upon the angle member 69. This will release engagement of the lock member 71 from the lock lug 76 automatically and will allow the lock frame assembly to move with the auxiliary draw-bar 23 in its set position. Since the angle member 69 is attached to the left front corner of the lead frame section 12 through the lever 70 the transverse frame member 26 of the front frame section will swing around the pivot 47 of the draw-bar arm 42 and will assume an angular position in which the front left corner of the main frame is in advance of the pivot 47 and the plane of the cutting edges of the disks 62 are substantially tangent to the arc of the turn being made. Since the left side of the lead section swings forwardly, it is evident that the pivot pin 16 will swing forwardly of the pivot pin 21 which connects the spacing bar 20 to the auxiliary draw-bar 23. The result will be that the spacing bar 20 will swing around the fulcrum of the pin 21 and will swing the pivot pin 17 forwardly of its normal position. This will exert a pull through the bracket 15 of the following section 13. At the same time the auxiliary draw-bar 51 which is fastened to the lead section at 52 and the following section 53 will co-act with the spacing bar 20 to cause the left forward side of the following section to swing rearwardly while the right forward side swings forwardly. Thus, the structure will act to automatically arrange the disks 62 in non-cutting positions although the disks will be in tracking positions for a right-hand turn.

After a right-hand turn is completed the tractor may again resume a straight course. When this is done the units 12 and 13 tend to swing back to their cutting position, and since the lock frame 73 is already set on the auxiliary draw-bar the parts will assume their original position and the member 71 will again lock with the lug 76. Attention is directed to the fact that when the lead and following units 12 and 13 are thus set and locked they will rigidly maintain this position under all conditions, including up hill and down hill travel.

With further reference to Fig. 1 of the drawings, it will be seen that due to the locking action of the member 73 on the auxiliary draw-bar the units will be held for backing in a straight line.

It will thus be seen that the harrow here disclosed provides simple means for setting and maintaining the lead and following sections of a disk harrow in non-cutting tracking positions, a normal cutting position and a right and left-hand turn, all of which positions and operations may be easily controlled by the operator of a tractor by which the harrow is drawn, and it will be further evident that the lead and following sections of the harrow may be maintained in a desirable articulate relation to each other and may be held against detrimental torsion and strains.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A harrow of the class described comprising a leading section and a following section, a spacing bar disposed between said sections and articulately connecting the leading section to the following section at points between the two sections, a secondary draw-bar articulately connecting the leading section to the following section, a bifurcated main draw-bar, one leg of which is connected to the forward edge of the leading section and the other leg of which is connected to the lever end of the spacing bar, a turning arm rigidly associated with the main draw-bar, and a collapsible angle element connecting the turning arm with the leading section adjacent its forward end.

2. A harrow of the class described comprising a leading section and a following section spaced with relation to each other, a spacing bar disposed between said sections and standing substantially parallel to the contiguous sides of said sections, said spacing bar representing a simple lever, one end being pivotally connected to the following section with the leading section pivotally connected to the bar at a point intermediate its ends and the opposite end swinging free at one end of the sections, a secondary draw-bar pivotally connected at one end to the rear side of the leading section and at the other end to the front side of the following section, said draw-bar being disposed at an angle to the contiguous sides of said sections, a main bifurcated draw-bar connected to a tractor at its forward end and having a pair of rearwardly extending legs, one connected to the forward side of the leading section and the other connected to the free end of the spacing bar and independently of the leading section, a collapsible angle element connected to the forward edge of the leading section and on the same side of the normal center of the harrow as is occupied by the free end of the spacing bar, a turning arm projecting laterally from the forward end of the main draw-bar and to which said collapsible angle element is pivotally connected, and means for adjusting the length of the leg of the main draw-bar which is directly connected to the leading section.

3. A harrow of the class described comprising a leading section and a following section spaced with relation to each other, a spacing bar disposed between said sections and standing substantially parallel to the contiguous sides of said sections, said spacing bar representing a simple lever, one end being pivotally connected to the following section with the leading section pivotally connected to the bar at a point intermediate its ends and the opposite end swinging free at one end of the sections, a secondary draw-bar pivotally connected at one end to the rear side of the leading section and at the other end to the front side of the following section, said draw-bar being disposed at an angle to the contiguous sides of said sections, a main bifurcated draw-bar connected to a tractor at its forward end and having a pair of rearwardly extending legs, one connected to the forward side of the leading section and the other connected to the free end of the spacing bar and independently of the leading section, a collapsible angle element connected to the forward edge of the leading section and on the same side of the normal center of the harrow as is occupied by the free end of the spacing bar, a turning arm projecting laterally from the forward end of the main draw-bar and to which said collapsible angle element is pivotally connected, means for adjusting the length of the leg of the main draw-bar which is directly connected to the leading section, and means temporarily holding the leading section of the harrow with relation to the main draw-bar.

4. A harrow of the class described comprising a leading section and a following section, normally disposed in spaced parallel relation to each other, a bracket carried by the leading section and projecting rearwardly from the rear side thereof at a point offset from the normal center of the harrow, a bracket carried by the following section and projecting forwardly from the forward edge thereof and being disposed adjacent to the normal center of the harrow, pivot pins, one carried by each of said brackets, said pivot pins lying in a plane substantially parallel to and intermediate the front and rear sides of the two sections, a spacing bar in the form of a simple lever mounted at a point intermediate its ends upon the pin carried by the bracket of the leading section and at one end upon the pin carried by the brackets of the following section, the opposite end extending laterally beyond the ends of the two sections on the same side of the normal center as is occupied by the front section bracket, a main draw-bar comprising a rigid element having a portion extending forwardly and rigidly connecting with the tractor and a leg extending rearwardly and at an angle to the normal center of the tractor and at the same side thereof as that occupied by the lever end of the spacing bar, an articulate connection between said draw-bar end and the lever end of the spacing bar, a second draw-bar leg pivotally connected to the rigid draw-bar structure upon the opposite side of the normal center of the harrow from that occupied by the rigid leg, said leg extending rearwardly and laterally of the harrow and being pivotally connected to the forward edge of the leading section on the opposite side of the normal center of the harrow from that occupied by the rigid draw-bar leg, a turning arm extending laterally from the main draw-bar at a point adjacent to a tractor by which the structure is drawn, and a collapsible angle element connecting said turning arm with the front side of the leading section at the end thereof opposite that to which the adjustable draw-bar leg is connected.

5. A harrow of the class described including a leading section, a following section, a secondary draw-bar articulately connecting the leading section and the following section, said draw-bar being pivoted to the leading section at a point adjacent its rear edge and on one side of its normal center and to the following section at a point near its forward edge and at the other side of its normal center, a spacing bar disposed between said sections normally holding the sections in laterally spaced relation to each other, said spacing bar being pivoted to the rear side of the leading section and to the forward side of the following section, a lever extension formed as a continuation of said spacing bar and projecting beyond one end of the leading section whereby said lever and spacing bar may swing as a unit to act in cooperation with the secondary draw-bar in disposing the leading section and following section in angling relation to each other, a main draw-bar structure interposed between the leading section and a tractor, said draw-bar structure being formed with a forward central bar adapted to be rigidly secured to the tractor against lateral movement and a pair of rearwardly and oppositely diverging draw-bar legs, one of said legs being rigid with the forwardly projecting portion, the other of said legs being pivotally connected thereto, a pivotal connection between said last-named leg and the forward side of the leading section, a connection between the end of the rigid leg and the lever end of the spacing bar, and means limiting the angling motion of the leading section when swinging in one direction with relation to the draw-bar.

6. A harrow of the class described including a leading section, a following section, a secondary draw-bar articulately connecting the leading section and the following section, said draw-bar being pivoted to the leading section at a point adjacent its rear edge and on one side of its normal center and to the following section at a point near its forward edge and at the other side of its normal center, a spacing bar disposed between said sections normally holding the sections in laterally spaced relation to each other, said spacing bar being pivoted to the rear side of the leading section and to the forward side of the following section, a lever extension formed as a continuation of said spacing bar and projecting beyond one end of the leading section whereby said lever and spacing bar may swing as a unit to act in cooperation with the secondary draw-bar in disposing the leading section and following section in angling relation to each other, a main draw-bar structure interposed between the leading section and a tractor, said draw-bar structure being formed with a forward central bar adapted to be rigidly secured to the tractor against lateral movement and a pair of rearwardly and oppositely diverging draw-bar legs, one of said legs being rigid with the forwardly projecting portion, the other of said legs being pivotally connected thereto, a pivotal connection between said last-named leg and the forward side of the leading section, a connection between the end of the rigid leg and the lever end of the spacing bar, and means limiting the angling motion of the leading section when swinging in one direction with relation to the draw-bar, said means including a laterally extending turning arm fixed to move with the tractor and a collapsible angle element connected to the end of said turning arm and secured to the forward side of the leading section upon the side of the leading section agreeing with that occupied by the turning arm.

7. A harrow of the class described including a leading section, a following section, a secondary draw-bar articulately connecting the leading section and the following section, said draw-bar being pivoted to the leading section at a point adjacent its rear edge and on one side of its normal center and to the following section at a point near its forward edge and at the other side of its normal center, a spacing bar disposed between said sections normally holding the sections in laterally spaced relation to each other, said spacing bar being pivoted to the rear side of the leading section and to the forward side of the following section, a lever extension formed as a continuation of said spacing bar and projecting beyond one end of the leading section whereby said lever and spacing bar may swing as a unit to act in cooperation with the secondary draw-bar in disposing the leading section and following section in angling relation to each other, a main draw-bar structure interposed between the leading section and a tractor, said draw-bar structure being formed with a forward central bar adapted to be rigidly secured to the tractor against lateral movement and a pair of rearwardly and oppositely diverging draw-bar legs, one of said legs being rigid with the forwardly projecting portion, the other of said legs being pivotally connected thereto, a pivotal connection between said last-named leg and the forward side of the leading section, a connection between the end of the rigid leg and the lever end of the spacing bar, means limiting the angling motion of the leading section when swinging in one direction with relation to the draw-bar, said means including a laterally extending turning arm fixed to move with the tractor and a collapsible angle element connected to the end of said turning arm and secured to the forward side of the leading section upon the side of the leading section agreeing with that occupied by the turning arm, and means for limiting the swinging movement of the leading section with relation to the draw-bar when turning in the opposite direction from that in which the collapsible angle element limits movement.

8. A harrow of the class described including a leading section, a following section, a secondary draw-bar articulately connecting the leading section and the following section, said draw-bar being pivoted to the leading section at a point adjacent its rear edge and on one side of its normal center and to the following section at a point near its forward edge and at the other side of its normal center, a spacing bar disposed between said sections normally holding the sections in laterally spaced relation to each other, said spacing bar being pivoted to the rear side of the leading section and to the forward side of the following section, a lever extension formed as a continuation of said spacing bar and projecting beyond one end of the leading section whereby said lever and spacing bar may swing as a unit to act in cooperation with the secondary draw-bar in disposing the leading section and following section in angling relation to each other, a main draw-bar structure interposed between the leading section and a tractor, said draw-bar structure being formed with a forward central bar adapted to be rigidly secured to the tractor against lateral movement and a pair of rearwardly and oppositely diverging draw-bar legs, one of said legs being rigid with the forwardly projecting portion, the other of said legs being pivotally connected thereto, a pivotal connection between said last-named leg and the forward side of the leading section, a connection between the end of the rigid leg and the lever end of the spacing bar, means limiting the angling motion of the leading section when swinging in one direction with relation to the draw-bar, said means including a laterally extending turning arm fixed to move with the tractor and a collapsible angle element connected to the end of said turning arm and secured to the forward side of the leading section upon the side of the leading section agreeing with that occupied by the turning arm, means for limiting the swinging movement of the leading section with relation to the draw-bar when turning in the opposite direction from that in which the collapsible angle element limits movement, and means for adjusting the length of the pivoted draw-bar leg.

9. A harrow of the class described comprising a leading section and a following section, a spacing bar disposed between said sections and articulately connecting the leading section to the following section at points between the two sections, a secondary draw-bar articulately connecting the leading section to the following section, a bifurcated main draw-bar, one leg of which is connected to the forward edge of the leading section and the other leg of which is connected to the lever end of the spacing bar, a turning arm rigidly associated with the main draw-bar, a collapsible angle element connecting the turning arm with the leading section adjacent its forward end, and means acting to set the two sections of the harrow at a desired draft angle with relation to each other.

10. A harrow of the class described comprising a leading section and a following section, a spacing bar disposed between said sections and articulately connecting the leading section to the following section at points between the two sections, a secondary draw-bar articulately connecting the leading section to the following section, a bifurcated main draw-bar, one leg of which is connected to the forward edge of the leading section and the other leg of which is connected to the lever end of the spacing bar, a turning arm rigidly associated with the main draw-bar, a collapsible angle element connecting the turning arm with the leading section adjacent its forward end, means acting to set the two sections of the harrow at a desired draft angle with relation to each other, and means for remotely controlling said setting means.

11. A harrow of the class described comprising a leading section and a following section, a spacing bar disposed between said sections and articulately connecting the leading section to the following section at points between the two sections, a secondary draw-bar articulately connecting the leading section to the following section, a bifurcated main draw-bar, one leg of which is connected to the forward edge of the leading section and the other leg of which is connected to the lever end of the spacing bar, a turning arm rigidly associated with the main draw-bar, a collapsible angle element connecting the turning arm with the leading section adjacent its forward end, means acting to set the two sections of the harrow at a desired draft angle with relation to each other, means for remotely controlling said setting means, and means for automatically releasing said setting means when the two sections of the harrow are in cutting position with relation to each other.

JOHN H. CLASEN.